United States Patent
Riley, Jr.

[15] 3,665,445
[45] May 23, 1972

[54] DETECTION SYSTEM

[72] Inventor: Robert E. Riley, Jr., Jackson, Miss.
[73] Assignee: Scientific Security Systems, Incorporated, Jackson, Miss.
[22] Filed: Dec. 22, 1970
[21] Appl. No.: 100,716

[52] U.S. Cl. ..........................................340/261, 340/258 R
[51] Int. Cl. .......................................................G08b 19/00
[58] Field of Search ..........................340/261, 258 R, 258 D

[56] References Cited

UNITED STATES PATENTS

| | | | |
|---|---|---|---|
| 3,261,009 | 7/1966 | Stetten et al............................ | 340/261 |
| 3,585,581 | 6/1971 | Aune..................................... | 340/261 |

Primary Examiner—John W. Caldwell
Assistant Examiner—Michael Slobasky
Attorney—Gordon W. Hueschen and Talivaldis Cepuritis

[57] ABSTRACT

An intruder detection system wherein vibrations generated by an intruder are detected apart from normal environmental noise and are utilized to set off an alarm. The system detects activity rate rather than total generated energy by measuring duration, frequency and amplitude of generated sound. Detected vibrations having a predetermined frequency range provide an input signal for both legs of a differential amplifier. The output signal of the differential amplifier is analyzed for presence of characteristics typical for intruder-generated vibrations.

5 Claims, 6 Drawing Figures

DETECTION SYSTEM

BACKGROUND OF THE INVENTION

Various alarm or detection systems responsive to particular types of sound to provide alarm indication are known in the art. The principal shortcoming of such systems is their inability to differentiate satisfactorily between background and transient noises on one hand and the noise generated by an intruder within the protected surroundings on the other. In addition, prior art systems usually employ a multitude of electromechanical components which greatly contribute to the bulk of the detection system and also adversely affect the reliability of such a system.

It is a principal object of the present invention to obviate the aforementioned shortcomings and to provide an intruder detection system utilizing solid state components which system detects intruder activity rate within the protected environment rather than the total generated energy therewithin.

Still other objects of the present invention will readily present themselves to one skilled in the art upon reference to the present specification, the drawings, and the claims.

SUMMARY OF THE INVENTION

The present invention contemplates a solid state detection system wherein information in form of generated vibrations is detected by transducer means which produce an electrical signal in response to vibrations impinging thereon. The produced signal is received by a bandpass amplifier means which provides an amplified output signal in response to a transducer signal of a frequency within a predetermined frequency range. Broadly the frequency range can be from about 1,000 Hertz to about 7,000 Hertz and preferably from about 1,500 Hertz to about 6,500 Hertz.

The amplified output signal is transmitted to a differential comparator means which is adapted to establish a background signal level and to pass an output signal which exceeds in magnitude the background signal level. The input time constant of the differential comparator means is such that it rejects all signals the duration of which is shorter than a predetermined time period, usually about 0.04 seconds.

The duration of an output signal passed by the differential comparator means is measured by a first monostable vibrator means which is coupled to and controls first and second gate means.

The first gate means generates an output signal in response to an input from the differential comparator means if the input is of a relatively shorter duration than a predetermined time period, as determined by the first monostable multivibrator means. Such an output signal is an event signal which, in turn, energizes a second monostable vibrator means to commence an analyze period during which time all event signals that are received are counted and stored by a counter means coupled therewith. Upon the count reaching a predetermine number within the analyze period (usually 4 to 10 event signals within a 10 to 90 second analyze period) an alarm means coupled to the counter means is energized and sounds an alarm.

The second gate means generates an output signal in response to an input from the differential comparator means if the input is of a relatively longer duration than a predetermined time period, as determined by the first monostable multivibrator means. Such an output signal is a reject signal which is not counted but which can be utilized to provide an indication to a person, such as a guard monitoring the system, that the detection system is functioning.

DESCRIPTION OF THE PREFERRED EMBODIMENTS

Figure 1:
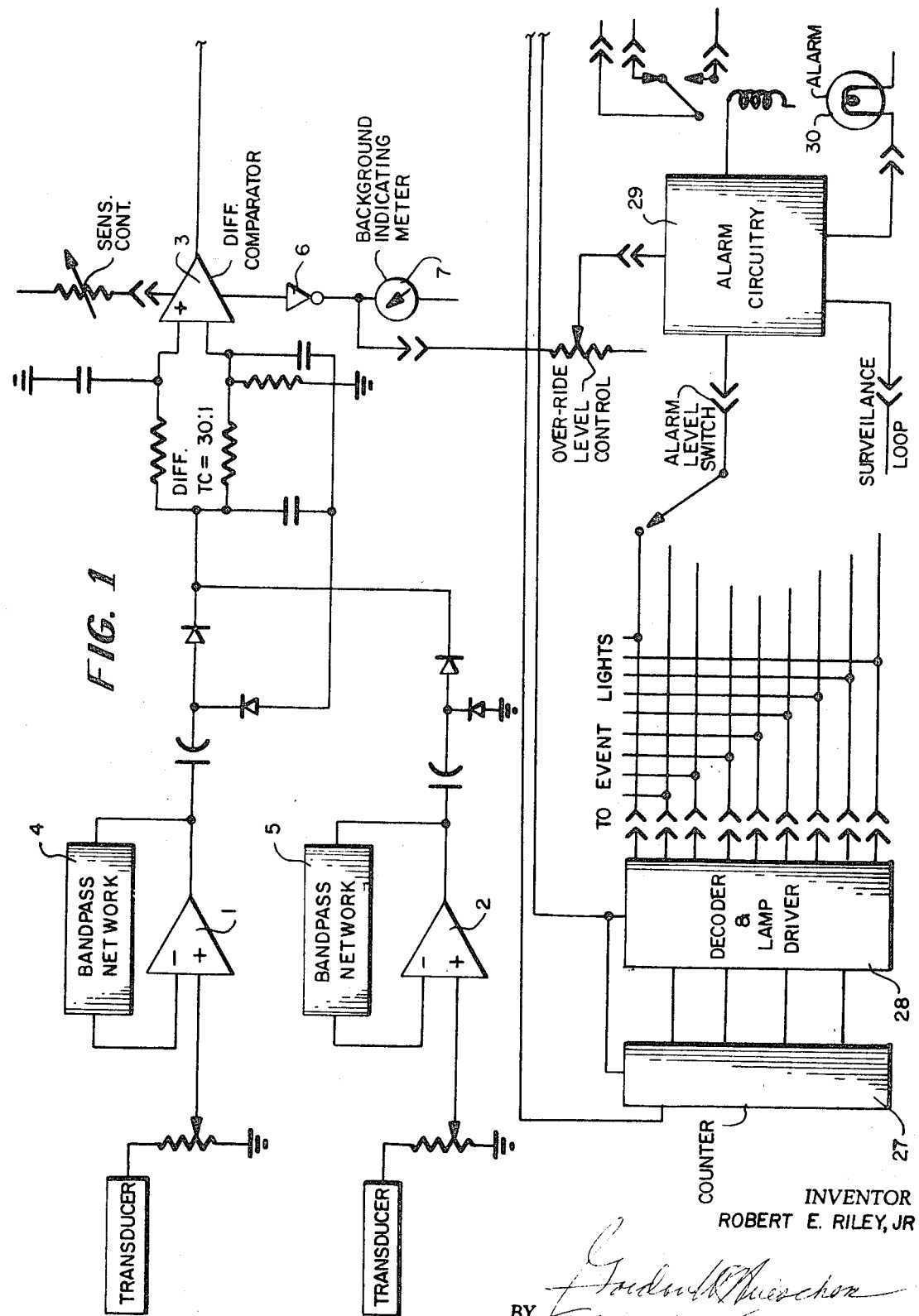
FIGS. 1 and 1a together show a logic diagram of the detection system of this invention.
Figure 1A:
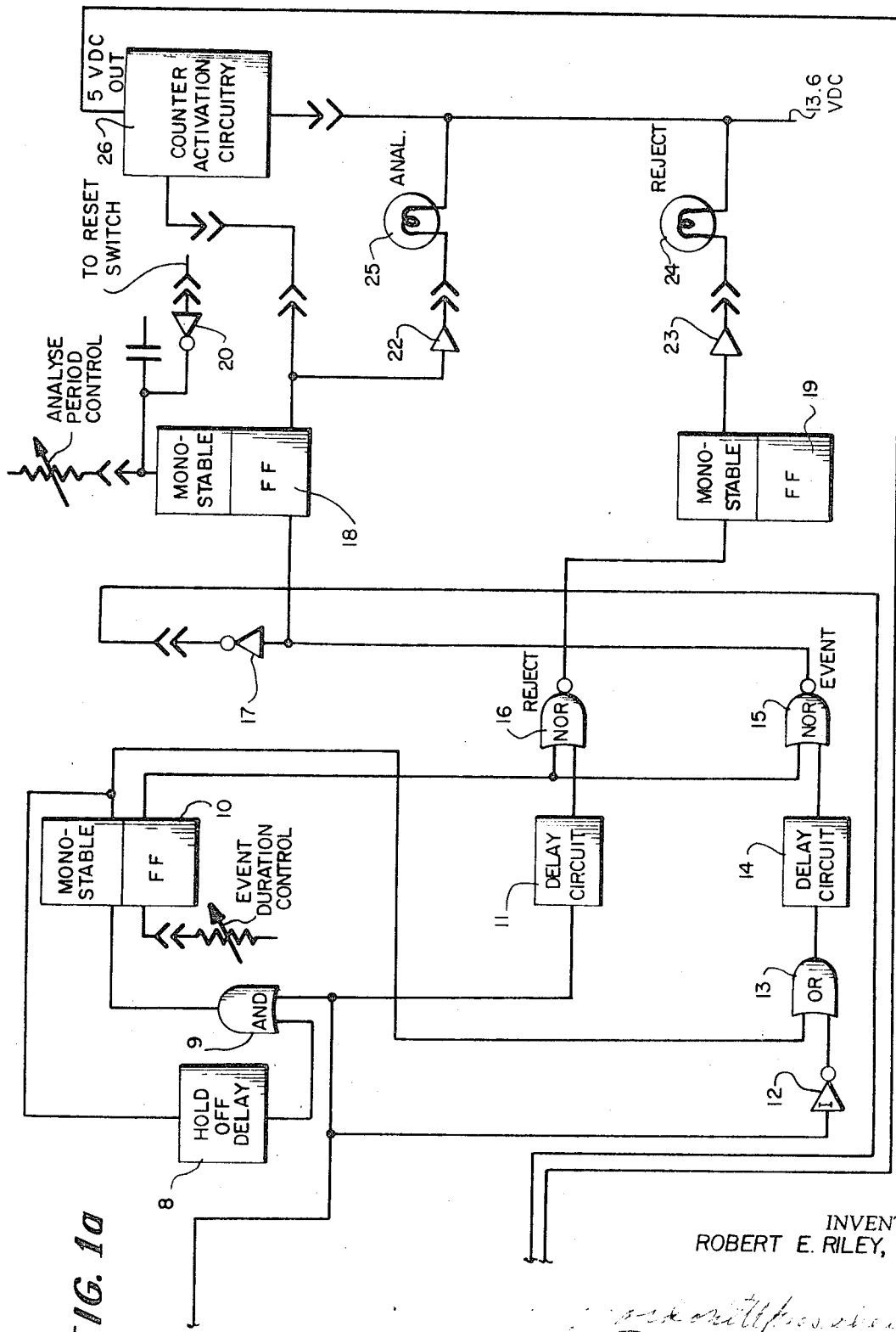

Referring to FIGS. 1 and 1a, information derived from suitable transducers such as microphones, contact microphones, and the like, in the form of an electrical signal is fed into suitable amplifiers 1 and 2, each provided with bandpass network 4 and 5, respectively. While two amplifiers are shown in FIG. 1 for purposes of illustration, only one bandpass amplifier is necessary. However, the number of such amplifiers can vary depending on the extent of the environment to be protected. The input signal is filtered and amplified, and the amplified signal fed to differential comparator 3 which also responds to background noises and establishes a condition whereby all signals greater than background signals are passed. In this particular instance the input time constant is selected so that all signals of less than approximately 0.04 seconds in duration are rejected. While the input time constant can be varied by an appropriate choice of circuit components, it has been found that intruder-generated signals almost always are of a longer duration than 0.04 seconds and this time constant is eminently satisfactory for this purpose.

The output signal passed by differential comparator 3 activates OR gate 13 and NOR gates 15 and 16 through delays of several microseconds imposed by delay circuit means 14 and 11, respectively. Inverter amplifier 12 is provided in the circuit to provide the necessary phase correction. The same output signal from differential comparator 3 also triggers monostable multivibrator 10, which measures signal duration, through AND gate 9. Holdoff delay circuit 8 is provided to prevent retriggering of multivibrator 10 for a time period of from about 0.6 to about 0.7 seconds after the initial triggering signal is received. The time constant for multivibrator 10 is determined by the setting of event duration control and usually ranges from about 0.06 to about 0.5 seconds.

At the end of the energization period of multivibrator 10 a determination of the presence of a signal at the input to NOR gates 15 and 16 is made. If signal is present at this time, it is rejected and monostable multivibrator 19 triggered, providing an indication of such state by means of amplifier 23 and reject light 24. On the other hand, if no signal is present NOR gate 15 emits an event signal which triggers monostable multivibrator 18 thereby commencing an analyze period during which all subsequent event signals are counted and stored. The initial event signal which starts the analyze period is also transmitted via amplifier 17 directly to counter 27, counted and stored.

Triggering of multivibrator 18 also energizes counter activation circuitry 26, counter 27 and decoder and signal lamp driver 28. The number of event signals necessary to set off alarm is determined by the setting of the alarm level switch and, once this number of events is counted during a given analyze period, alarm circuitry 29 is energized thereby sounding the alarm and giving a visual indication thereof by means of alarm light 30. In the event an alarm is sounded during a particular analyze period, monostable multivibrator 18 is reset by a signal via amplifier 20 generated by closing a reset switch to ground.

If desired, indicator light 25 can be provided parallel to counter activation circuitry 26 and driven by amplifier 22 so as to give a visual indication that an analyze period is in progress.

In the event an attempt is made to deliberately jam the detection system by generating a very high background noise level, an override provision will cause energization of alarm circuitry 29 via amplifier 6 and thus set off the alarm as soon as the background noise level, as determined by differential comparator 3, exceeds a predetermined level which is set by the override level control.

Background noise level can be conveniently monitored by means of background indicating meter 7.

The present detection system can also be provided with a surveillance loop means which is included in alarm circuitry 29. Supervision of audio lines, contacts on outside doors, etc., can thus be readily achieved inasmuch as an alarm will be sounded if an open circuit condition is created anywhere in the surveillance loop.

Figure 2:
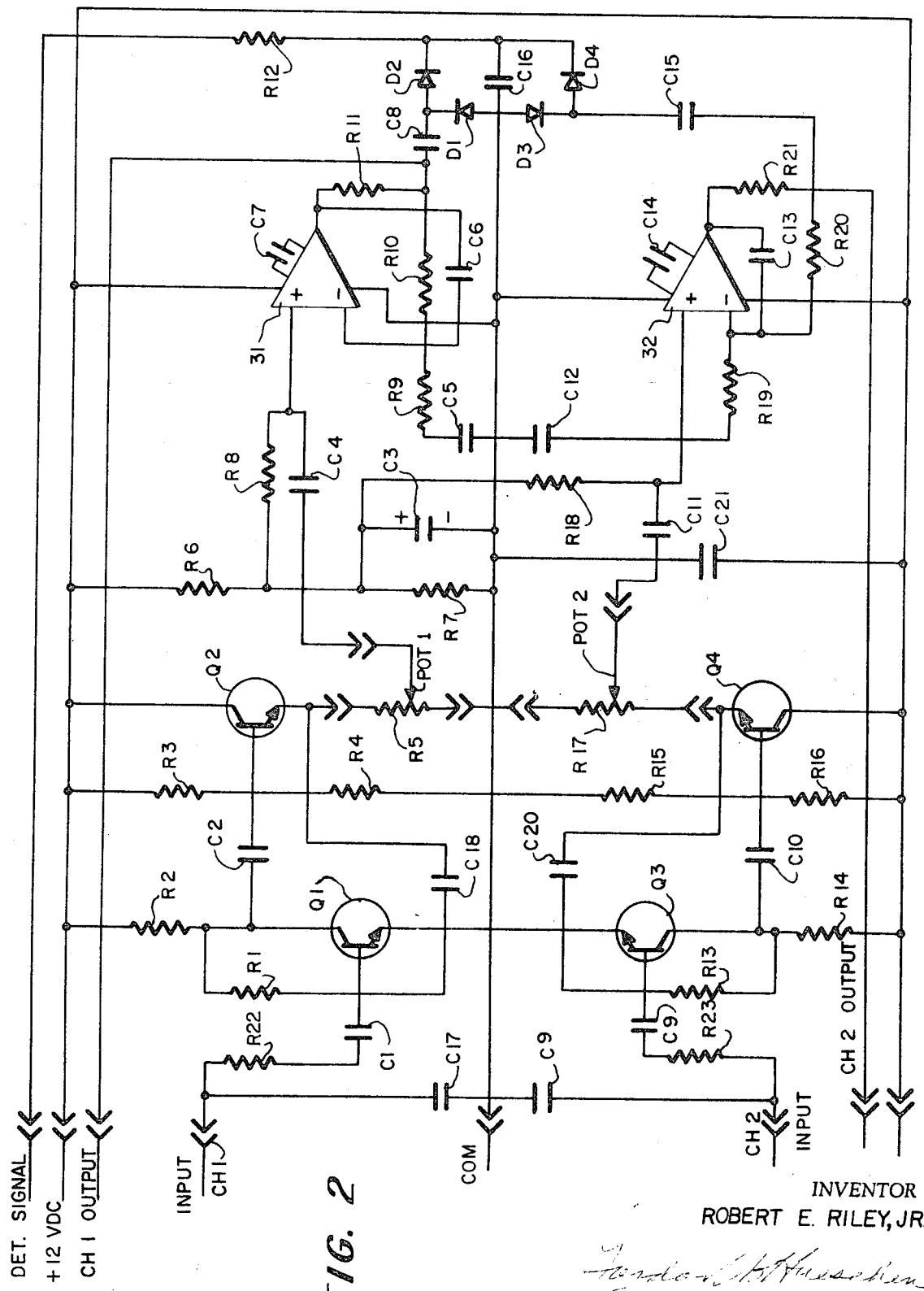
FIG. 2 is a schematic diagram of a bandpass amplifier circuit suitable for use with the present system.

A typical bandpass amplifier circuit suitable for use with the present detection system is shown in FIG. 2. Transducer input from channel 1 first passes through a preamplifier comprising NPN transistors Q1 and Q2 with gain control being provided on the preamplifier output by means of potentiometer POT 1. Similarly transducer input from channel 2 is passed through a preamplifier comprising NPN transistors Q3 and Q4 and gain control is provided by means of potentiometer POT 2.

Preamplifier output is further amplified by means of amplifiers 31 and 32, respectively, and detection accomplished by diodes D1 and D2 for channel 1 and diodes D3 and D4 for channel 2. The detected signal is then transmitted to differential comparator 3.

The output signal from each of the channels, if desired, can be fed to a suitable speaker system where a monitor is situated so that generated noises within the audible range can also be heard.

In the amplifier circuit shown in FIG. 2 the bandpass network components for channel 1 are capacitors C1, C2, C4, C5, C6, and C7, together with resistors R3, R4, R8 and R9 interconnected as shown. Similarly, the bandpass network components for channel 2 are capacitors C9, C10, C11, C12, C13 and C14 together with resistors R16, R17, R18 and R19 interconnected as shown.

Figure 3:
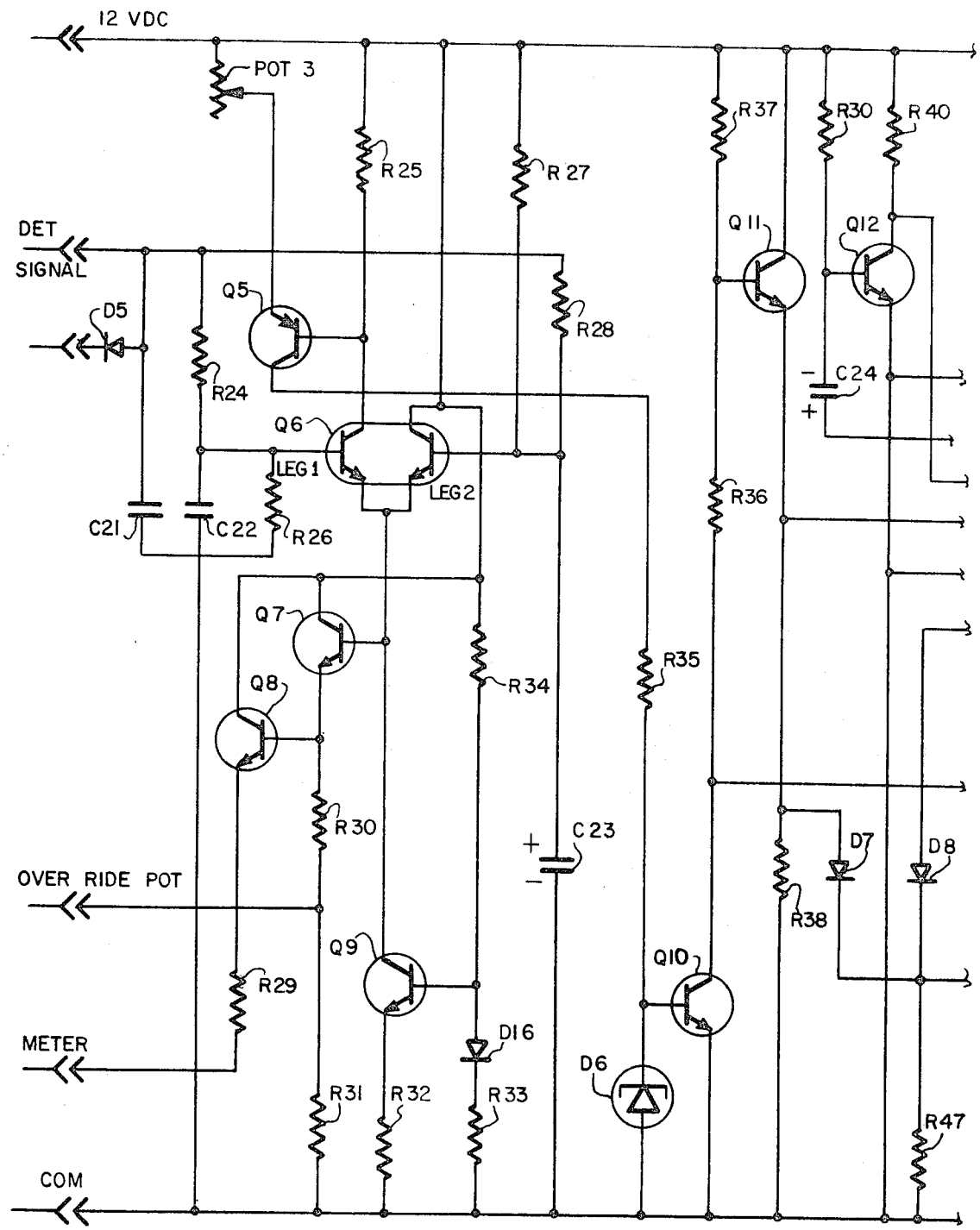
FIGS. 3 and 3a together show a schematic diagram of a detection and analysis circuit embodying the present invention.
Figure 3A:
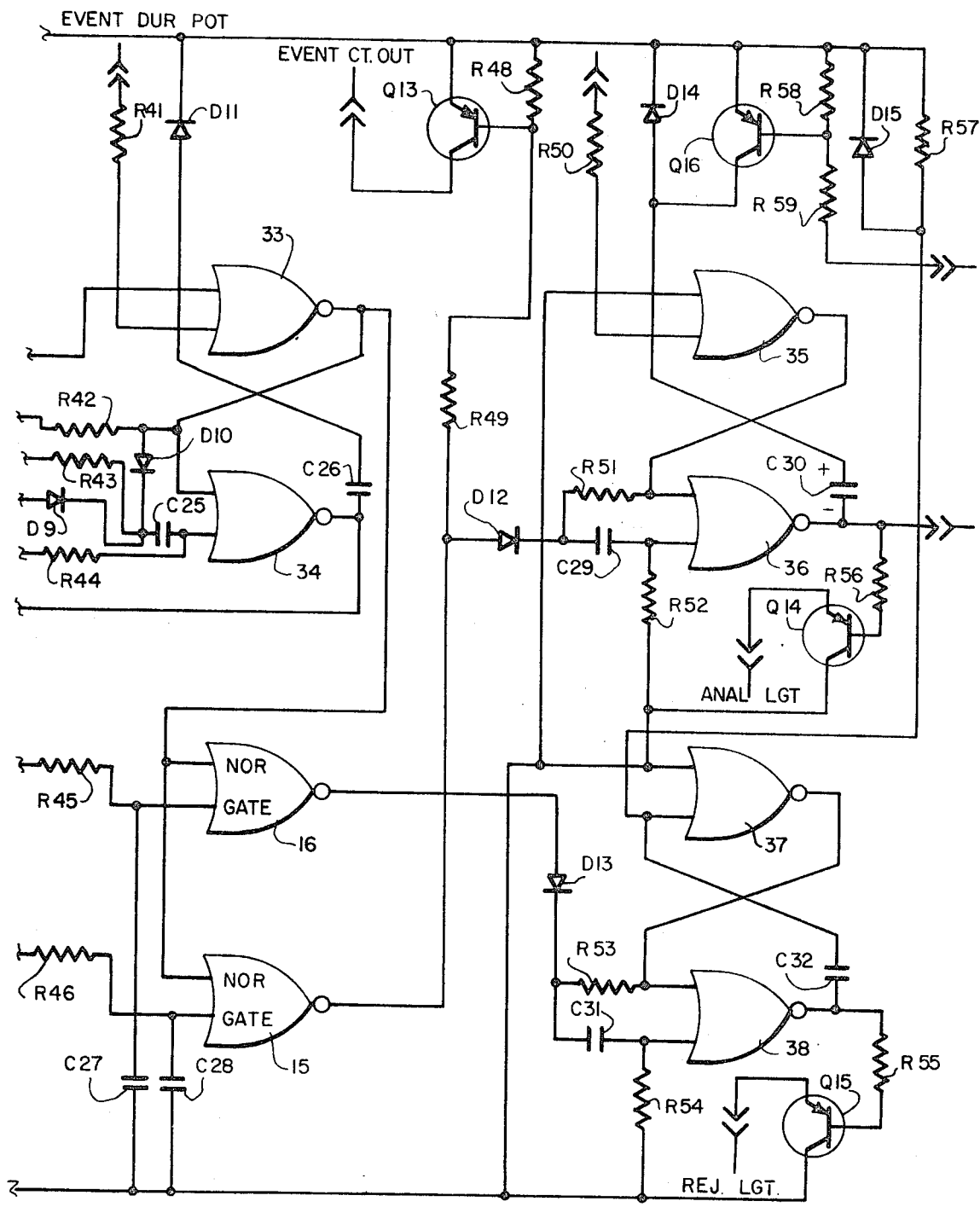

Referring to FIGS. 3 and 3a, differential comparator 3 comprises two matched NPN transistor device Q6, tunnel diode D6 which is a current-sensitive device receiving from Q6 an output signal which may be a potential event signal, PNP transistor Q5 which together with potentiometer POT 3 and current limiting resistor R35 provide sensitivity control for the comparator, and NPN transistor Q10 which generates a signal in response to a signal from tunnel diode D6. Resistor R36 functions as collector load regretor for transistor Q10.

Detected signal from the bandpass amplifier is fed into both legs of device Q6. A floating base level for device Q6 is established by signal input via leg 2 and by generating a constant opposing current by means of a circuit which includes NPN transistor Q9, resistors R32, R33 and R34 and diode D16.

Indication of a potential event signal is received by matched transistor device Q6 via leg 1. For this leg the desired time constant to reject all sounds of duration shorter than a predetermined time period is established by means of filter capacitors C21 and C22 together with resistors R24 and R26. Time constant for leg 2 of device Q6 is established by capacitor C23 together with resistor R28, thereby providing the desired time constant ratio or differential between legs 1 and 2 of device Q6.

Resistor R25 serves as bias resistor for transistor Q5 and also as collector load resistor for input via leg 1 of device Q6. Resistor R27 serves as bias resistor for input via leg 2 of device Q6.

When the floating base level of differential comparator 3 reaches or exceeds a predetermined value set by the override level control a signal is transmitted to alarm circuitry 29 via emitter follower amplifier 6 which comprises NPN transistors Q7 and Q8 connected in Darlington arrangement together with resistors R29, R30 and R31. Amplifier 6 also drives background indicating meter 7 with resistor R29 serving as a meter calibrating resistor.

Inverter amplifier 12 provides the necessary phase correction for the signal from transistor Q10 and comprises PNP transistor Q11, bias resistors R36 and R37, and collector load resistor R38.

When tunnel diode D6 fires, transistors Q10 and Q11 are turned on and monostable vibrator 10 is triggered through AND gate 9 which comprises diodes D9 and D10 together with load resistor R43. Mono-stable multivibrator 10 comprises conventional cross-coupled, two-input gates 33 and 34 together with capacitors C25 and C26, diode D11 and resistors R41 and R44. In order to allow capacitor C26 to be fully recharged between active states of the multivibrator, hold-off delay circuit 8 is provided preventing retriggering of multivibrator 10 for about 0.5 seconds to about 1 second, as desired. Delay circuit 8 comprises NPN transistor Q12, resistors R39, R40 and R42, and capacitor C24 interconnected as shown in FIG. 3. Diode D11 also promotes a rapid recharge of capacitor C26.

OR gate 13 comprises diodes D7 and D8 together with load resistor R47. Nor gate 15 is provided with delay circuit 14 comprising resistor R46 and capacitor C28. The delay introduced by this circuit permits determination whether or not an event signal is present. If during the delay period, which slightly overlaps the termination of signal from multivibrator 10, transistor Q10 goes to non-conductive or low state, then a significant event has been detected and an appropriate signal is transmitted further. If, on the other hand, transistor Q10 is still in conductive or high state at the end of the delay period a reject signal is transmitted by means of NOR gate 16. Duration of the delay period normally ranges from about 10 to about 20 microseconds.

Delay circuit 11 for NOR gate 16 is provided in order to permit multivibrator 10 to turn on without generating an event signal. Delay circuit 11 comprises capacitor C27 and resistor R45.

First event signal in a particular series is transmitted via amplifier 17 to counter 27 and stored. Amplifier 17 comprises PNP transistor Q13 and bias resistors R48 and R49. At the same time the first event signal also energizes monostable multivibrator 18 which starts an "analyze period" during which the number of event signals that are received are counted and stored. The analyze period normally has a duration of from about 10 to about 90 seconds and can be varied as desired by adjusting analyze period control which can be a variable resistor. Mono-stable multivibrator 18 is similar to multivibrator 10 and comprises cross-coupled two-input gates 35 and 36 together with capacitors C29 and C30, diodes D12 and D14, and resistors R50, R51 and R52. Diode D14 promotes a rapid recharge of capacitor C30. If an alarm is sounded during an analyze period, i.e., if the requisite number of event signals has been received and stored, that analyze period is immediately terminated and multivibrator reset by means of a signal received via amplifier 20 which comprises PNP transistor Q16 and bias resistors R58 and R59.

Amplifier 22 comprising PNP transistor Q14 and bias resistor R56 drives analyzer light 25 which is on during an analyze period.

Output from multivibrator 18 energizes counter activation circuitry 26 which will be discussed in detail below.

Optionally third monostable multivibrator 19 can be provided which is adapted to be energized by a reject signal from gate 16. The advantage of this provision is that by having also a reject indication a continuous check of the condition and operability of the detection system is obtained. Monostable multivibrator 19 comprises cross-coupled, two-input gates 37 and 38 together with capacitors C31 and C32, resistors R53, R54 and R57 and diodes D13 and D15. Diode D15 promotes a rapid recharging of capacitor C32. Reject light 24 is driven by amplifier 23 which comprises PNP transistor Q15 and bias resistor R55, and which receives its input from multivibrator 19.

Figure 4:
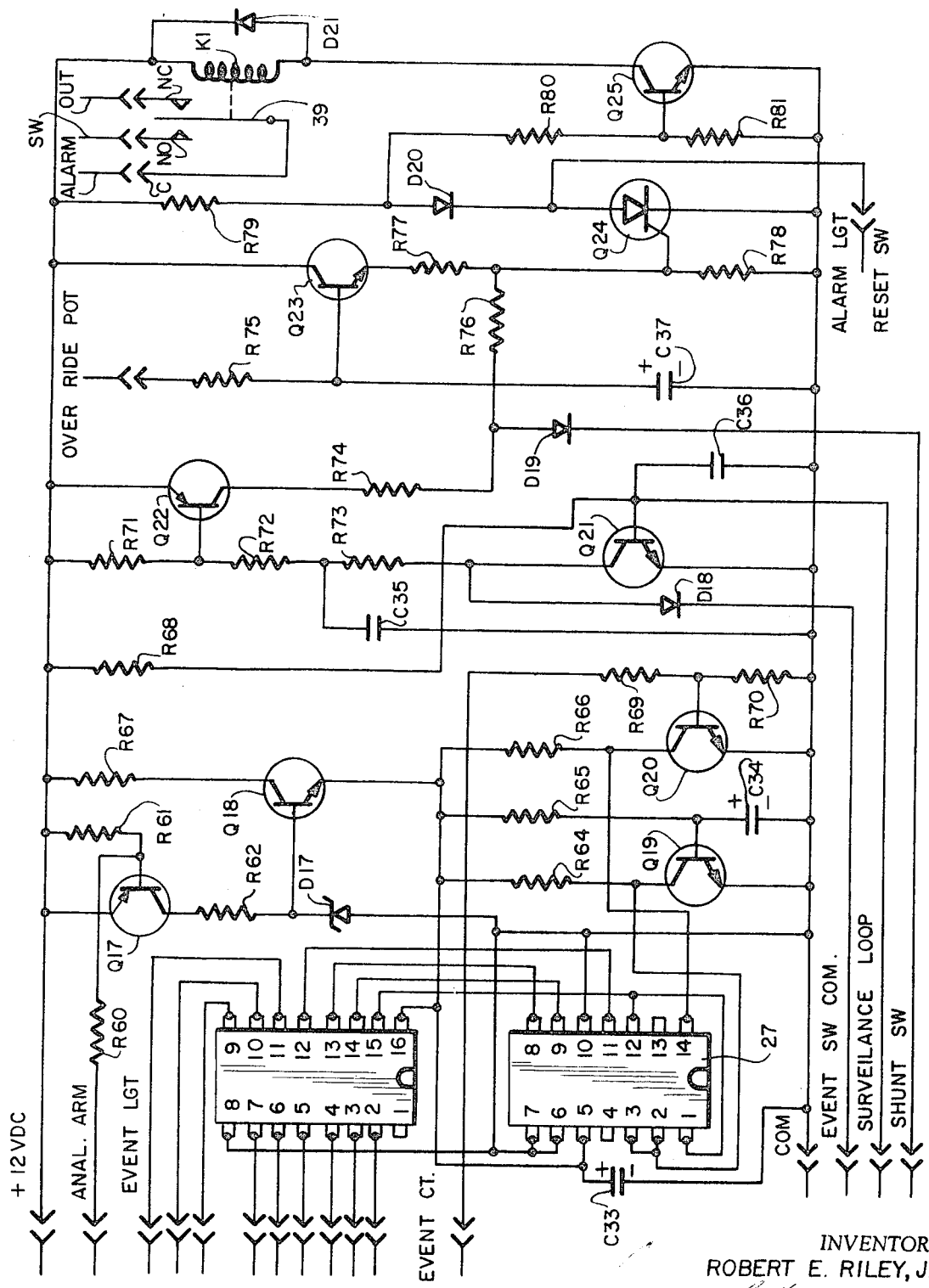
FIG. 4 is a schematic diagram of a counting and alarm circuit embodying the present invention.

Counter activation or energizing circuitry 26, as shown in FIG. 4, comprises PNP transistor Q17, resistors R60 and R61, collector load resistor R62, Zener diode D17, and NPN transistor Q18 together with collector load resistor R67. Level translation and phase inversion for initial event signal from amplifier 17 is accomplished by transistor Q20 provided with bias resistors R69 and R70 and collector load resistor R66. The resetting of counter 27 to zero is accomplished by a delay circuit which comprises transistor Q19, capacitor C34, bias resistor R65, and collector load resistor R64. Decoder and lamp driver 28 is, of course, coupled with and responsive to counter 27.

When the requisite number of event signals within an analyze period, as determined by the setting of the alarm level switch, has been received and stored, alarm circuitry 29 is energized. The energizing portion of circuit 29 comprises blocking diodes D18 and D19, NPN transistor 21, PNP transistor Q22, the associated resistors R71, R72, R73 and R74, and capacitor C36. The optional surveillance loop which has been indicated in the FIGURES is also connected to the base of transistor Q21. Capacitor C35 is connected into the circuit to reduce noise.

Transistor Q21 is normally in a high conductance state, except when receiving the alarm signal. In such an event, or when a surveilance loop connected to the base of transistor Q21 is opened, transistor 21 goes to a low conductance state. When this occurs, transistor 22 is turned on and biases silicone control rectifier Q24 which, in turn sets off the alarm through signal inverting transistor Q25 and its associated bias resistors R79, R80 and R81. Coil K1 of switch 39 is normally energized when the alarm is off, with diode D21 serving a blocking function. Thus the inverted signal from transistor Q25 de-energizes coil K1 and closes switch 39 so as to sound the alarm which can only be turned off by means of a reset switch.

Biasing of silicone control rectifier Q24 to the conductive state can also be achieved by NPN transistor Q23 which, together with its bias resistor R75 and load resistor R77, is provided in the override circuit which is activated when a certain predetermined base level is reached by differential comparator 3. Again an alarm is sounded in the same manner as set forth herein above.

Power for the hereinabove described detection system is provided by a conventional direct current power supply usually at about 12v. By a suitable change of system components, the system can be adapted to be energized by any other direct current source at a different voltage provided the necessary power demand can be met.

The foregoing detailed discussion of the preferred embodiments is intended as illustrative and is not to be taken as limiting. Still other variations and rearrangements of components within the spirit and scope of this invention will readily present themselves to one skilled in the art.

I claim:

1. Solid state detection system which comprises
    transducer means for producing an electrical signal in response to vibrations impinging thereon;
    bandpass amplifier means coupled to said transducer means, responsive to a signal output from said transducer means, and adapted to provide an amplified output signal in response to a signal from said transducer means having a frequency within a predetermined range;
    differential comparator means coupled to said bandpass amplifier means, responsive to an amplified output signal from said amplifier means, and adapted to establish a background signal level and to pass an output signal which exceeds in magnitude said background signal;
    first monostable multivibrator means having a predetermined time constant coupled to said differential comparator means and adapted to measure the duration of an output signal passed by said comparator means;
    first gate means coupled to said differential comparator means and said first monostable vibrator means and adapted to generate an event signal in response to an input from said differential comparator means of a relatively shorter duration than a predetermined time period and a signal from said first monostable multivibrator means;
    second gate means coupled to said differential comparator means and said first monostable vibrator means and adapted to generate a reject signal in response to an input from said differential comparator means of a relatively longer duration than a predetermined time period and a signal from said first monostable multivibrator means;
    second monostable multivibrator means having a predetermined time duration coupled to said first gate means and responsive to an event signal therefrom;
    counter means coupled to said second monostable multivibrator means, adapted to be energized by said second monostable vibrator means, responsive to an event signal from said first gate means, and adapted to store said event signal; and
    an alarm means coupled to said counter means and energized in response to a predetermined number of event signals stored by said counter means.

2. The detection system of claim 1 wherein a third monostable vibrator means is provided coupled to said second gate means, responsive to a reject signal therefrom, and energizing a reject indicator means in response to said reject signal.

3. The detection system of claim 1 wherein an indicator means is provided coupled to said second monostable vibrator means and is energized when the vibrator is energized.

4. The detection system of claim 1 wherein the counter means comprises a counting unit and a decoding unit responsive to said counting unit.

5. The detection system of claim 1 wherein the alarm means is additionally coupled to the differential comparator means and is adapted to be energized when the background signal exceeds a predetermined level.

* * * * *